(12) United States Patent
Bing

(10) Patent No.: US 10,663,620 B2
(45) Date of Patent: May 26, 2020

(54) METHOD AND APPARATUS FOR FORECASTING SOLAR RADIATION AND SOLAR POWER PRODUCTION USING SYNTHETIC IRRADIANCE IMAGING

(71) Applicant: NEO Virtus Engineering, Inc., Littleton, MA (US)

(72) Inventor: James M. Bing, Concord, MA (US)

(73) Assignee: NEO Virtus Engineering, Inc., Littleton, MA (US)

(*) Notice: Subject to any disclaimer, the term of this patent is extended or adjusted under 35 U.S.C. 154(b) by 150 days.

(21) Appl. No.: 14/403,865

(22) PCT Filed: May 30, 2013

(86) PCT No.: PCT/US2013/043388
§ 371 (c)(1),
(2) Date: Nov. 25, 2014

(87) PCT Pub. No.: WO2013/181408
PCT Pub. Date: Dec. 5, 2013

(65) Prior Publication Data
US 2015/0177415 A1   Jun. 25, 2015

Related U.S. Application Data

(60) Provisional application No. 61/792,118, filed on Mar. 15, 2013, provisional application No. 61/653,158, filed on May 30, 2012.

(51) Int. Cl.
*G01W 1/00* (2006.01)
*G01W 1/12* (2006.01)
(Continued)

(52) U.S. Cl.
CPC ............... *G01W 1/12* (2013.01); *G01W 1/10* (2013.01); *H02S 50/00* (2013.01); *F24S 2201/00* (2018.05)

(58) Field of Classification Search
CPC ..................... H02S 50/00; G01W 1/12
(Continued)

(56) References Cited

U.S. PATENT DOCUMENTS 7,706,990 B2   4/2010   Herzig
7,742,897 B2   6/2010   Herzig
(Continued)

FOREIGN PATENT DOCUMENTS

WO   WO 2011/140565 A1   11/2011

OTHER PUBLICATIONS

Extended European Search Report EP Application No. EP 13 79 7164, dated Dec. 15, 2015.
(Continued)

*Primary Examiner* — Michael P Nghiem
(74) *Attorney, Agent, or Firm* — Hamilton, Brook, Smith & Reynolds, P.C.

(57) ABSTRACT

In an embodiment, measurements are simulated of direct normal irradiance, diffuse horizontal and global horizontal irradiance from groups of two or more photovoltaic arrays and/or irradiance sensors which are located in close proximity to each other and which have different tilt and azimuth angles. Irradiance measurements derived from solar power system power measurements are combined with measurements made by irradiance sensors to synthesize an image of ground level global horizontal irradiance which can be used to create a vector describing motion of that image of irradiance in an area of interest. A sequence of these irradiance images can be transformed into a time series from which a motion vector can be derived.

15 Claims, 16 Drawing Sheets

(51) Int. Cl.
*G01W 1/10* (2006.01)
*H02S 50/00* (2014.01)

(58) Field of Classification Search
USPC .......................................................... 702/3
See application file for complete search history.

(56) References Cited

U.S. PATENT DOCUMENTS

| | | | |
|---|---|---|---|
| 7,809,621 B2 | 10/2010 | Herzig | |
| 8,190,395 B2 | 5/2012 | Peleg et al. | |
| 8,504,325 B2 | 8/2013 | Kerrigan et al. | |
| 8,725,459 B2 | 5/2014 | Herzig et al. | |
| 8,738,328 B2 | 5/2014 | Herzig et al. | |
| 9,322,951 B2 | 4/2016 | Herzig et al. | |
| 2005/0039787 A1* | 2/2005 | Bing | G01W 1/10 136/243 |
| 2010/0017341 A1 | 1/2010 | Bing | |
| 2010/0108860 A1 | 5/2010 | Sherman et al. | |
| 2010/0271222 A1 | 10/2010 | Kerrigan et al. | |
| 2010/0318297 A1 | 12/2010 | Hezig et al. | |
| 2011/0060475 A1* | 3/2011 | Baldwin | G01W 1/10 700/295 |
| 2011/0178641 A1 | 7/2011 | Judkins | |
| 2011/0276269 A1* | 11/2011 | Hummel | H02J 3/383 702/3 |
| 2011/0282601 A1 | 11/2011 | Hoff | |
| 2011/0282602 A1 | 11/2011 | Hoff | |
| 2012/0166085 A1* | 6/2012 | Gevorkian | F24J 2/00 702/3 |
| 2012/0191351 A1* | 7/2012 | Kerrigan | G01W 1/12 702/3 |
| 2013/0085885 A1* | 4/2013 | Sahai | G06Q 50/06 705/26.4 |
| 2013/0166211 A1 | 6/2013 | Kerrigan et al. | |
| 2013/0258068 A1* | 10/2013 | Schmidt | G01W 1/10 348/49 |
| 2014/0012524 A1* | 1/2014 | Flammer, III | H02J 3/00 702/60 |
| 2014/0188410 A1 | 7/2014 | Kerrigan et al. | |
| 2014/0278107 A1 | 9/2014 | Kerrigan et al. | |
| 2014/0278108 A1 | 9/2014 | Kerrigan et al. | |
| 2015/0309207 A1 | 10/2015 | Kerrigan et al. | |
| 2016/0190984 A1* | 6/2016 | Caine | H02S 50/10 702/60 |
| 2016/0322528 A9 | 11/2016 | Herzig et al. | |
| 2016/0363695 A9 | 12/2016 | Kerrigan et al. | |
| 2018/0175790 A1* | 6/2018 | Sanfilippo | H02J 3/383 |

OTHER PUBLICATIONS

Munge, et al., "Development of Simplified Calculations for a Multipyranometer Array for the Measurement of Direct and Diffuse Solar Radiation," 2000 [retrieved on Dec. 12, 2013]. Retrieved from the Internet:<URL: http://repository.tamu.edu/bitstream/handle/1969.1/6801/ESL-HH-00-05-31.pdf?sequence=4>. entire document.

Notification of Transmittal of the International Search Report and the Written Opinion of the International Searching Authority, PCT/US2013/043388, dated Dec. 20, 2013.

Notification of Transmittal of International Preliminary Report on Patentability, PCT/US2013/043388, dated Jun. 16, 2014.

Bird, R. E., and R. L. Hulstrom, "Simplified Clear Sky Model for Direct and Diffuse Insolation on Horizontal Surfaces," Technical Report No. SERI/TR-642-761, Golden, CO: Solar Energy Research Institute (1981).

Hall, J.W., "Forecasting Solar Radiation for the Los Angeles Basin—Phase II Report," [retrieved from www.WayBackMachine.com] [online] http://www.solardatawarehouse.com/ASES_2011/ASES_forecasting.pdf (Apr. 2, 2013).

Hall, J.W., "Forecasting Solar Power with Adaptive Models—A Pilot Study," [retrieved from www.WayBackMachine.com] [online] http://www.solardatawarehouse.com/forecasting%20solar%20power.pdf (Jun. 16, 2012).

King, D.L., et al., "Photovoltaic Array Performance Model," Sandia Report, Sandia National Laboratories, Albuquerque, New Mexico (2004).

Marquez, R., and Coimbra, C. "Intra-hour DNI forecasting based on cloud tracking image analysis" (2012).

Munger, B., "An Improved Multipyranometer Array for the Measurement of Direct and Diffuse Solar Radiation." Masters Thesis Texas A&M University, (1997).

Perez, R., et al., "Validation of short and medium term operational solar radiation forecasts." Solar Energy, 84: 2161-2172 (2010).

Solectria, Yaskawa Solectria Solar [retrieved from www.WayBackMachine.com] [online] http://www.solren.com/?page_id=26 (Jan. 19, 2012).

Tigo Energy [retrieved from Way Back Machine ] [online] https://installations.tigoenergy.com/base/main/summary/sysid/86 (Aug. 6, 2011).

* cited by examiner

741

$$I_{tn} = \begin{bmatrix} 1 & 1 & 1 & 1 & 1 & 1 \\ .5 & 1 & 1 & 1 & 1 & 1 \\ .5 & 1 & 1 & .3 & 1 & 1 \\ 1 & .5 & 1 & .3 & .3 & 1 \\ 1 & 1 & 1 & .3 & 1 & 1 \\ .7 & .5 & 1 & 1 & 1 & 1 \end{bmatrix}$$

$$I_{tn} = \begin{bmatrix} 1 & 1 & 1 & 1 & 1 & 1 \\ .5 & 1 & 1 & 1 & 1 & 1 \\ .5 & 1 & 1 & .3 & 1 & 1 \\ 1 & .5 & 1 & .3 & .3 & 1 \\ 1 & 1 & 1 & .3 & 1 & 1 \\ .7 & .5 & 1 & 1 & 1 & 1 \end{bmatrix} \quad I_{tn+1} = \begin{bmatrix} 1 & .5 & 1 & 1 & 1 & 1 \\ 1 & .5 & 1 & 1 & .3 & 1 \\ 1 & 1 & .5 & 1 & .3 & .3 \\ .5 & 1 & 1 & 1 & .3 & 1 \\ 1 & .7 & .5 & 1 & 1 & 1 \\ .7 & .7 & 1 & .5 & .7 & 1 \end{bmatrix}$$

FIG. 7C $$I_{tn*s1} = \begin{bmatrix} X & 1 & 1 & 1 & 1 & 1 \\ X & .5 & 1 & 1 & 1 & 1 \\ X & .5 & 1 & 1 & .3 & 1 \\ X & 1 & .5 & 1 & .3 & .3 \\ X & 1 & 1 & 1 & .3 & 1 \\ X & .7 & .5 & 1 & 1 & 1 \end{bmatrix} \Longleftrightarrow \longleftarrow 721$$

$$I_{tn*s2} = \begin{bmatrix} X & .5 & 1 & 1 & 1 & 1 \\ X & .5 & 1 & 1 & .3 & 1 \\ X & 1 & .5 & 1 & .3 & .3 \\ X & 1 & 1 & 1 & .3 & 1 \\ X & .7 & .5 & 1 & 1 & 1 \\ X & X & X & X & X & X \end{bmatrix} \nearrow \longleftarrow 722$$

$$I_{tn*s3} = \begin{bmatrix} .5 & 1 & 1 & 1 & 1 & 1 \\ .5 & 1 & 1 & .3 & 1 & 1 \\ 1 & .5 & 1 & .3 & .3 & 1 \\ 1 & 1 & 1 & .3 & 1 & 1 \\ .7 & .5 & 1 & 1 & 1 & 1 \\ X & X & X & X & X & X \end{bmatrix} \Updownarrow \longleftarrow 723$$

$$I_{tn*s4} = \begin{bmatrix} 1 & 1 & 1 & 1 & 1 & X \\ 1 & 1 & .3 & 1 & 1 & X \\ .5 & 1 & .3 & .3 & 1 & X \\ 1 & 1 & .3 & 1 & 1 & X \\ .5 & 1 & 1 & 1 & 1 & X \\ X & X & X & X & X & X \end{bmatrix} \searrow \longleftarrow 724$$

$$I_{tn*s5} = \begin{bmatrix} 1 & 1 & 1 & 1 & 1 & X \\ 1 & 1 & 1 & 1 & 1 & X \\ 1 & 1 & .3 & 1 & 1 & X \\ .5 & 1 & .3 & .3 & 1 & X \\ 1 & 1 & .3 & 1 & 1 & X \\ .5 & 1 & 1 & 1 & 1 & X \end{bmatrix} \Longleftarrow \longleftarrow 725$$

$$I_{tn*s6} = \begin{bmatrix} X & X & X & X & X & X \\ 1 & 1 & 1 & 1 & 1 & X \\ 1 & 1 & 1 & 1 & 1 & X \\ 1 & 1 & .3 & 1 & 1 & X \\ .5 & 1 & .3 & .3 & 1 & X \\ 1 & 1 & .3 & 1 & 1 & X \end{bmatrix} \nearrow \longleftarrow 726$$

$$I_{tn*s7} = \begin{bmatrix} X & X & X & X & X & X \\ 1 & .5 & 1 & 1 & 1 & 1 \\ 1 & .5 & 1 & 1 & .3 & 1 \\ 1 & 1 & .5 & 1 & .3 & .3 \\ .5 & 1 & 1 & 1 & .3 & 1 \\ 1 & .7 & .5 & 1 & 1 & 1 \end{bmatrix} \Downarrow \longleftarrow 727$$

$$I_{tn*s8} = \begin{bmatrix} X & X & X & X & X & X \\ X & 1 & 1 & 1 & 1 & 1 \\ X & .5 & 1 & 1 & 1 & 1 \\ X & .5 & 1 & 1 & .3 & 1 \\ X & 1 & .5 & 1 & .3 & .3 \\ X & 1 & 1 & 1 & .3 & 1 \end{bmatrix} \searrow \longleftarrow 728$$

FIG. 7D

$$I_{tn+1} - I_{tn*s1} = \begin{bmatrix} z & -.5 & 0 & 0 & 0 & 0 \\ z & 0 & 0 & 0 & -.7 & 0 \\ z & .5 & -.5 & 0 & 0 & -.7 \\ z & 0 & .5 & 0 & 0 & .7 \\ z & -.3 & -.5 & 0 & .7 & 0 \\ z & 0 & .5 & -.5 & -.7 & 0 \end{bmatrix} \Longrightarrow \longleftarrow 731$$

FIG. 7E $$I_{tn+1} - I_{tn*s2} = \begin{bmatrix} z & 0 & 0 & 0 & 0 & 0 \\ z & 0 & 0 & 0 & 0 & 0 \\ z & 0 & 0 & 0 & 0 & 0 \\ z & 0 & 0 & 0 & 0 & 0 \\ z & 0 & 0 & 0 & 0 & 0 \\ z & z & z & z & z & z \end{bmatrix} \nearrow \longleftarrow 732$$

FIG. 7F

METHOD AND APPARATUS FOR FORECASTING SOLAR RADIATION AND SOLAR POWER PRODUCTION USING SYNTHETIC IRRADIANCE IMAGING

RELATED APPLICATIONS

This application is the U.S. National Stage of International Application No. PCT/US2013/043388, filed May 30, 2013, which designates the U.S., published in English, and claims the benefit of U.S. Provisional Application No. 61/792,118, filed on Mar. 15, 2013 and U.S. Provisional Application No. 61/653,158, filed on May 30, 2012. The entire teachings of the above applications are incorporated herein by reference.

BACKGROUND

The installed base of solar energy power systems in general, and photovoltaic systems in particular, is growing rapidly around the world as a result of government policies and incentives, decreases in its installed cost, and increases in the cost of conventionally generated electricity. Solar irradiance is, on an annual basis, periodic and predictable. However on an hourly or sub-hourly basis, solar energy often intermittent and appears unpredictable. As an electrical generation technology solar energy has suffered the stigma, in the mainstream commercial energy community, of being unreliable and lacking the ability to be dispatched as and when it is needed. As increasing amounts of solar energy generating capacity are deployed, mechanisms are needed to reconcile the natural variations of the solar resource with the constant reliability requirements of the modern electrical grid, and energy trading requirements in those regions with deregulated energy markets. For system operators who must manage the dispatch of generation, the reserves and the transmission constraints of the grid, solar energy presents no operational problem as long as its contribution is a small percentage of the energy flowing through the system. However large amounts of solar energy, whether on the customer's side or on the supply side of the revenue meter, present a serious management challenge to the stability and reliability of the grid, as well as to the transactions of energy markets. Several recent technological developments are brought together in this technology that make it possible to forecast ground level irradiance, and thus solar energy production, across a region or utility service territory.

SUMMARY

In accordance with principles of the invention, a map or pattern or image of irradiance levels is generated in a region such as the county of Sacramento or the greater Boston area or some other, generally urban and suburban region, based on information from the power production of roof top PV systems. The area can have sections which do not have any PV systems, for example rural agricultural areas, and in those areas we can deploy more expensive, traditional forms of irradiance monitoring. The inventive approach leverages data available from existing PV systems. The form of the irradiance in the generated map is a combination of direct normal (beam component) and diffuse horizontal (scatter component). These two components can easily be combined to give global horizontal irradiance (global horizontal is the total irradiance seen looking up into the dome of the sky.) Global horizontal irradiance (GHI) cannot be decomposed into its direct and diffuse subcomponents without sophisticated measurement equipment, or without a detailed knowledge of the current meteorological conditions or without using a process of combining multiple differently oriented measurements such as we use in this approach. A reason to know direct normal irradiance (DNI) and diffuse horizontal irradiance (DHI) is because if these two components are known and if the date, time and a location on the earth are known, the irradiance hitting any surface of any orientation at that location can be calculated. If the irradiance hitting a surface is known and if that surface is a solar generating systems, the electrical power that the system will produce at that moment in time can be calculated.

In one aspect, a sequence of these maps, patterns or images of ground level irradiance are generated and from that sequence a time series is formed. The time series is used to forecast a future map or pattern or image of irradiance. In an embodiment, the process is performed on a sub-hourly basis to create a near-real-time forecast. This forecast can be for a time horizon of up to three hours or more and can be in increments of five minutes or less. Many of the PV systems which are installed today have the capability to report their power data or be polled to get their power data. With that future map or pattern or image and knowledge of the characteristics of any solar power system in the area of that map or pattern or image the power produced by any such system can be calculated. The reporting from these systems, from a multitude of manufacturers, is asynchronous so the data is grouped into time stamped bins or frames through the following example procedure:

a. Collect data from PV systems, primarily via the internet, indicating how much power they are generating at a particular moment in time.

b. Group the data into bins or frames and apply a time stamp to the bins thus roughly synchronizing the groups of data.

c. Calculate the irradiance hitting the surface of the solar collector of the PV system based upon the efficiency with which those systems convert irradiance into electrical power.

d. Create groups of two or more irradiance values from PV systems and/or irradiance sensors whose collectors do not point in the same directions (ones who do not have the same tilt and azimuth angles) and which are in close proximity (e.g., this can be data from a PV system on one roof and one from a neighbor's house a block away.)

e. Using the groups of two or more irradiance values from PV systems and/or irradiance sensors whose collectors do not point in the same directions and using the "multi-pyranometer array" approach, direct normal irradiance and diffuse horizontal irradiance are calculated for the part of the map, pattern or image where the house is located. Global horizontal is also calculated.

f. If PV systems which measure their power production and which have different orientations are not available in an area of the map, pattern or image of interest, existing traditional irradiance measurement devices may be accessed or traditional irradiance measurement devices may be deployed.

g. The process of the last two steps is repeated until a map, pattern or image of ground level direct normal irradiance, diffuse horizontal and global horizontal is generated.

h. A sequence of these maps, patterns or images of ground level direct normal irradiance, diffuse horizontal and global horizontal is generated and from that sequence project or forecast a map, pattern or image of ground level direct normal irradiance, diffuse horizontal and global horizontal in the future.

i. The forecast of ground level direct normal irradiance and diffuse horizontal irradiance, along with knowledge of the characteristics of solar power (PV systems or other solar power technologies) systems is used, to calculate the future power production of those solar power systems.

This disclosure describes a method and apparatus for collecting irradiance data across a region of interest within a utility grid. It describes a method and apparatus for forecasting irradiance levels and solar power production in that region of interest. This method entails a network of solar power systems, irradiance sensors and other irradiance sensitive devices whose power production data and solar data can be collected in real-time and near-real-time and then processed into a pattern which indicates the current state of ground level irradiance across a geographic region of interest. These irradiance levels are then used to calculate future power levels from solar power generating plants in the area of the network. The method and apparatus described herein uses measurements of solar power system electrical output to simulate the irradiance incident upon the solar power array. This incident irradiance is referred to as global tilt irradiance (GTI) or also plane of array irradiance (POA). The simulated values of irradiance from solar power systems are combined with irradiance values measured via traditional methods, such as silicon or thermopile pyranometers or other means, to create a map or pattern or image of irradiance "pixels" in a gridded sensing network in the region of interest. From the irradiance data collected from this synthesized array of power systems and sensors direct normal irradiance (DNI), diffuse horizontal irradiance (DHI) and global horizontal irradiance (GHI) are simulated.

The synthesized irradiance monitoring array data are used to create a sequence of maps or patterns or images of ground level DNI, DHI, and GHI. From a series of these images a velocity vector of changing irradiance on the ground in an area of interest is derived. This velocity vector, in combination with forecast and current data describing cloud cover, ambient temperature and other meteorological parameters, is applied to the current image of ground level DNI, DHI, and GHI, and is used to forecast an image of direct normal irradiance and diffuse horizontal irradiance in the geographic area of interest. The forecast DNI and DHI values are then used to calculate future global tilt irradiance for solar power systems in the region of interest. The forecast GTI and temperature data, in combination with known characteristics of solar power systems in the area of interest, are then used to simulate hourly and sub-hourly forecasts of solar power production.

Knowledge of changing irradiance levels in a region can be used to create minute by minute forecasts of changing power contributions to the grid from distributed solar power generating systems for use by electric utilities to provide increased situational awareness of the electrical power system for grid management purposes. The same information can be used to assess the performance of solar power systems, for operational management of solar power production facilities, for use for energy trading or for surveying the solar resource in a particular area within the region of interest.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 7A, 7B, 7C, 7D, 7E and 7F are a flow diagram and example matrices which describe an example process of calculating a ground level irradiance image velocity vector.

DETAILED DESCRIPTION

Figure 1:
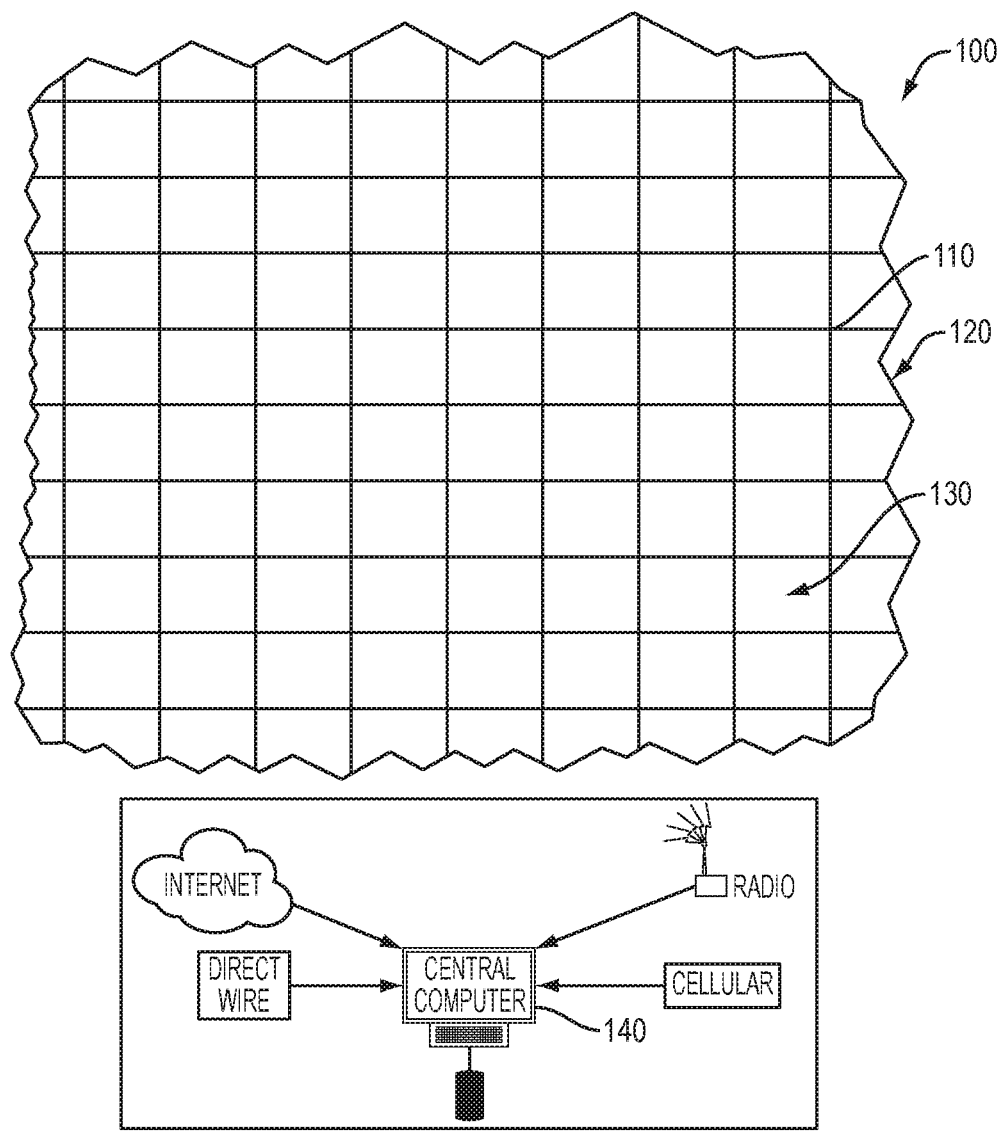
FIG. 1 illustrates a system 100 which includes a plurality of PV generating units, data acquisition system which monitor PV generating units, and or irradiance meters, in a gridded network 110, in a region of interest 120 served by an electric utility whose data are received, stored and processed a central computer 140.

In general FIG. 1 shows one embodiment of the present disclosure that provides a system 100 for predicting direct normal, diffuse horizontal, and global horizontal irradiance. The system is defined over a geographic region of interest 120. The region of interest 120 is subdivided into a gridded pattern 110 comprised of grid cells. Each grid cell 130 in the system 100 includes any or all of one or more of an irradiance monitoring device which can measure direct normal irradiance and diffuse horizontal irradiance and which can communicate with a central computer, and or groups of two or more of any combination of the following which have different tilt and or azimuth angles and which are in close physical proximity and which have communications capability to a central computer, of an irradiance monitoring device, a PV generating unit which can measure and report its energy production, a kilowatt-hour meter which measures and reports the energy production of a PV generating unit, a data acquisition system which measures and reports the ac production of a PV generating unit, and or a data acquisition system which measures and reports the dc production of a PV generating unit.

Collectively the levels of direct normal, diffuse horizontal, and global horizontal irradiance in the grid cells 130 form pixels in an image in a gridded network 110, in a region of interest 120 served by an electric utility by electrical transmission or distribution systems. This irradiance data is received, stored and processed a central computer 140 to form forecasts of irradiance.

Figure 2A:
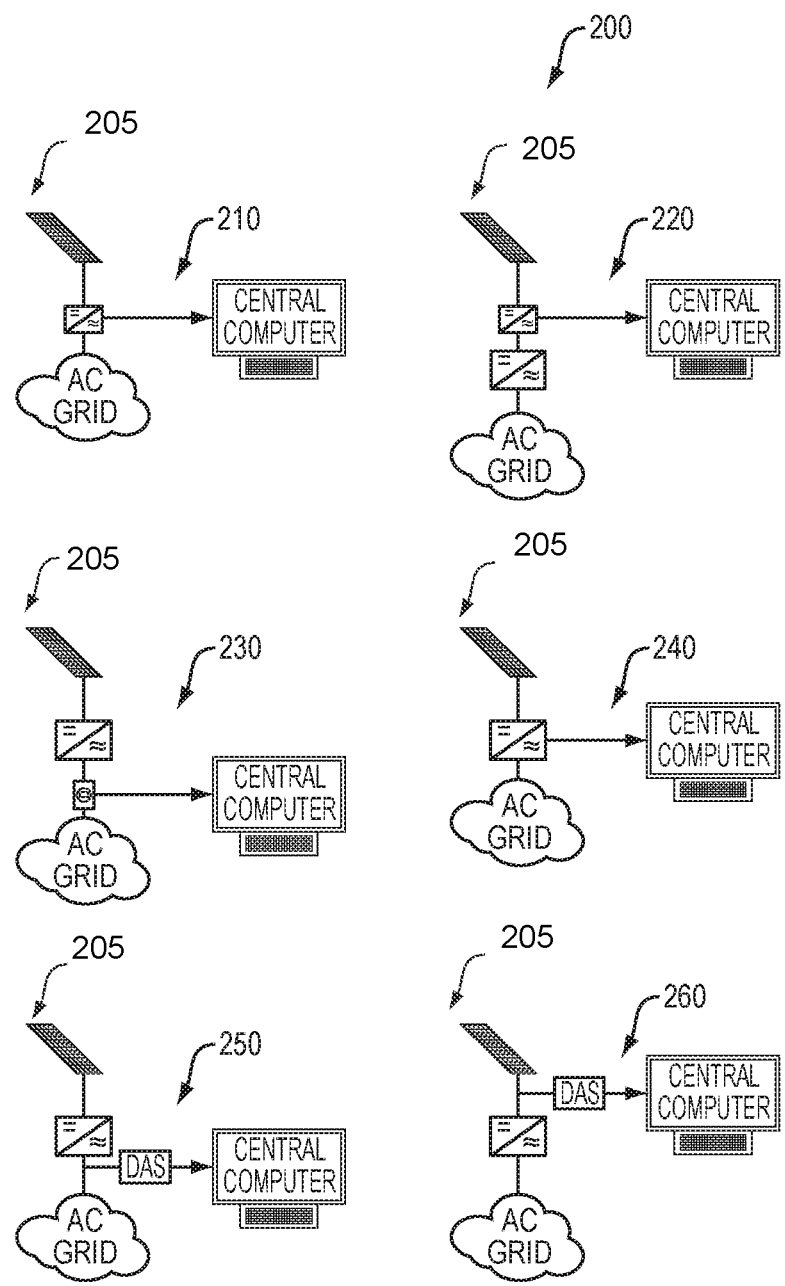
FIG. 2A shows examples of solar power system electronic components which have the capability to measure the power produced by a solar power system and the capability to communicate that power production data to a remote computer.

FIG. 2A is a depiction 200 of examples of PV generating units which can measure and report their energy production and have communications capability to a central computer. Examples of such systems 200 which may have power measurement capability and communications capability include micro-inverters and AC modules 210, DC optimizer devices 220, smart meters used to measure PV system output 230, string inverters and central inverters 240, and data acquisition systems (DAS) which measure either ac power output 250 and or dc power output 260. These type of devices can report average or instantaneous power production. Each of the PV generating units 200 has an irradiance sensitive surface 205.

Figure 2B:
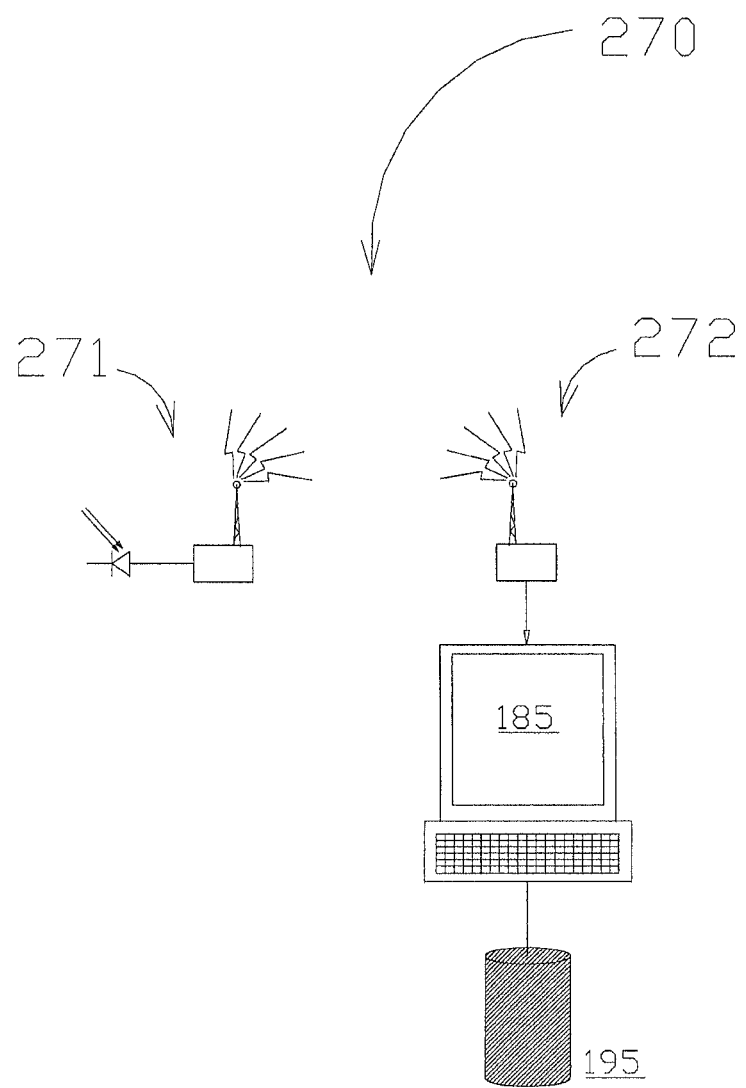
FIG. 2B is a depiction of an example of an irradiance sensor 270 which has the capability to communicate with a central computer via wireless signal or other means.

FIG. 2B is an example of an autonomous irradiance sensor system 270, comprised of an irradiance sensitive device and a wireless transmitter 271 and a wireless receiver device 272, which can report measured irradiance either wirelessly or by other means to a central computer.

Figure 2C:
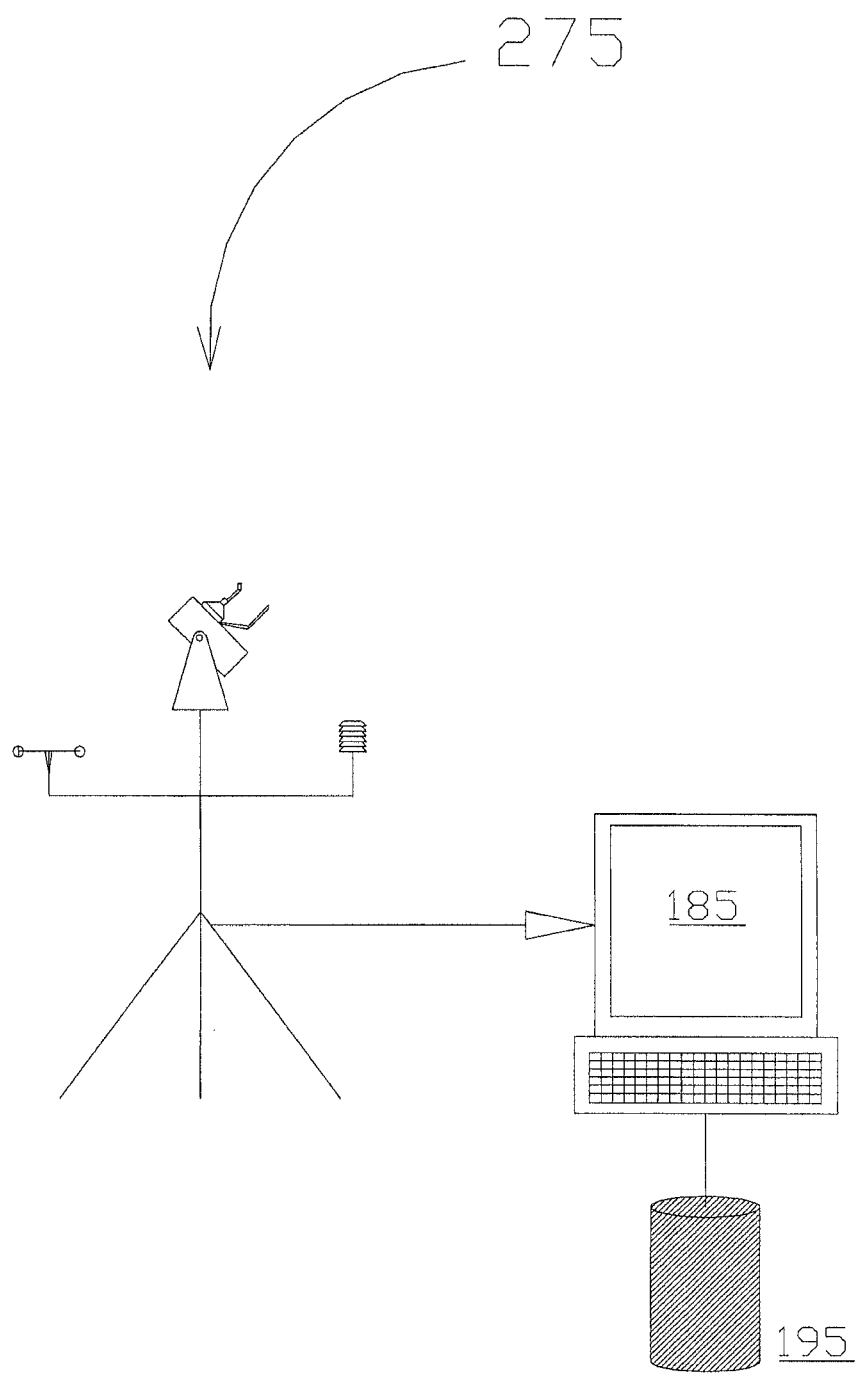
FIG. 2C is an image of a weather monitoring station 275 which has the capability to monitor irradiance and other metrological parameters and the ability to communicate with a central computer via the internet, power line carrier, wireless signal or other means.

FIG. 2C sensor 275 is an example of an irradiance monitoring device which can measure direct normal irradiance and diffuse horizontal irradiance and which can communicate with a central computer. In the embodiment of the system 100 for predicting direct normal, diffuse horizontal, and global horizontal irradiance across a region of interest this type of device may be used in the grid cells which do not have or two or more of any combination of an irradiance monitoring device 270 or a PV generating unit such as 210, 220, 230, 240, 250 or 260 which can measure and report its energy production and which have different tilt and or azimuth angles and are physically adjacent and which have communications capability to a central computer.

Figure 2D:
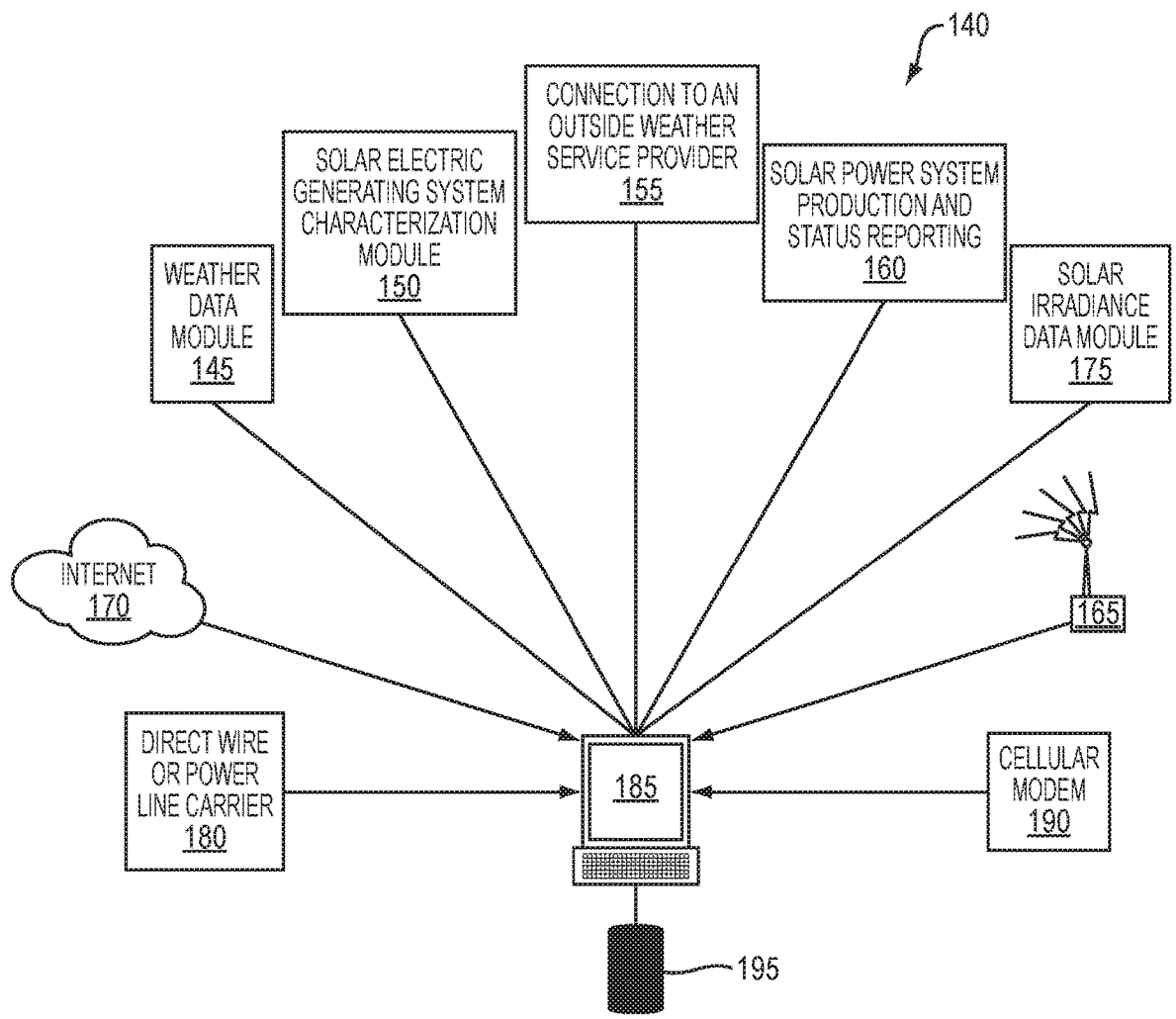
FIG. 2D is an example of a central computer processor 140.

FIG. 2D is a component of a system 100 which includes a central computer processor 140, a database 195, a weather data module 145, a solar irradiance data module 175, a solar electric generating system characterization module 150, a connection to an outside weather service provider 155 and solar power system production and status reporting 160, and an output device 185. The central computer processor accesses solar power system production data and irradiance data through connections to the internet 170, wireless receivers 165, by direct wire or power line carrier 180, cellular modem 190, or other means.

Figure 2E:
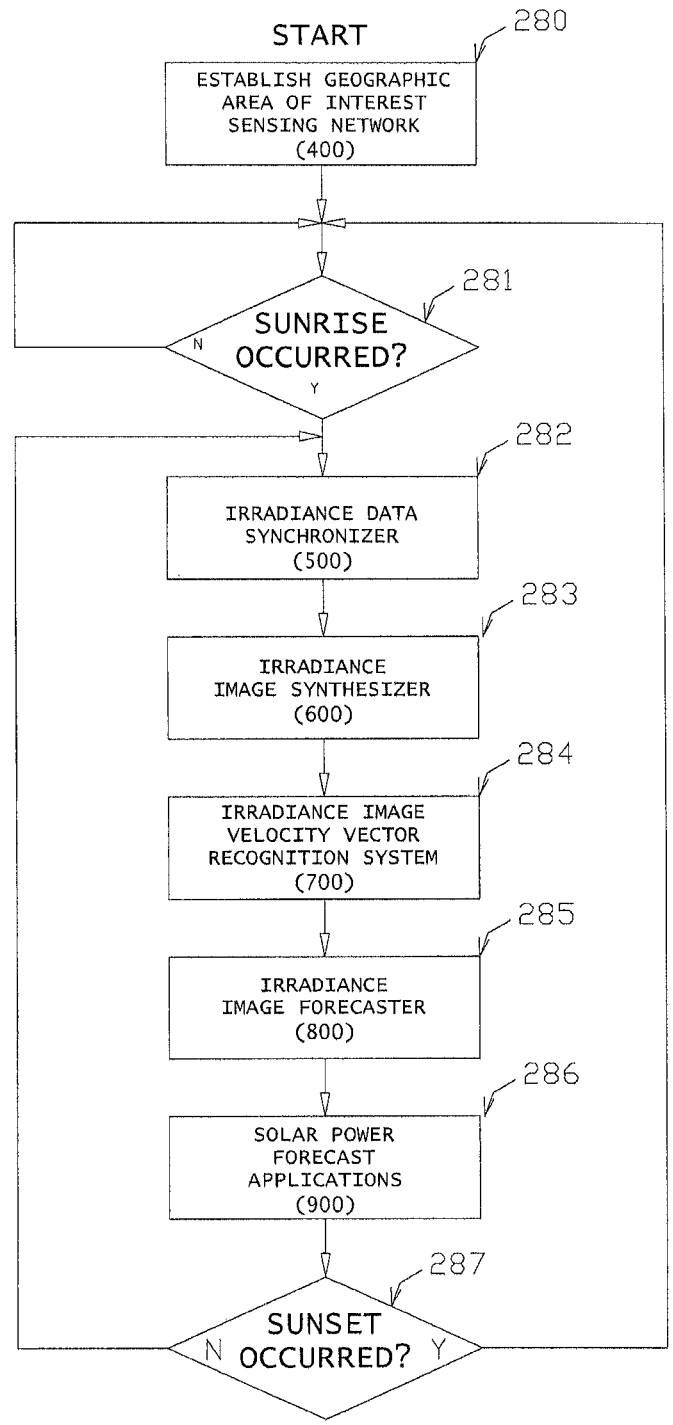
FIG. 2E is an example of a flow diagram 280 of the overview of the irradiance and solar power forecasting method.

This system provides a process, apparatus and software program for organizing ground-based irradiance and meteorological hardware measurement devices, satellite weather data, weather forecasting software, solar energy production data, and solar energy production simulation software, that enables the forecasting and monitoring of solar irradiance and solar power production in an area of interest, which can be created from the following main components or modules using the following general steps:

1) In FIG. 2E, 280, a network of solar power systems with communications capability, ground-based irradiance and meteorological measurement devices with remote communications capability, satellite weather data sources and weather forecast data sources is identified.
2) In FIG. 2E, 282, a software program for creating synchronized data frames from diverse asynchronous irradiance and solar power data sources is run.
3) In FIG. 2E a software program for creating an image of ground level irradiance over the region defined by the irradiance sensing network 283, whose raw irradiance values are normalized to one (1) using clear sky model is run.
4) In FIG. 2E a software program 284 for recognizing a velocity vector of ground level GHI, defined by two or more sequential ground level irradiance images, is run.
5) In FIG. 2E a software program which uses a current image of ground level irradiance in combination with the velocity vector defined in step 4 above to forecast the position of the ground level irradiance 285 image is run.
6) In FIG. 2E one or more software programs which use measurements or forecasts of ground level irradiance, in combination with known characteristics of solar power systems, to calculate the irradiance incident upon the surface of the solar power system 286, and then calculate the power output of the system is run.
7) In FIG. 2E the process is repeated for the next time step until sunset 287. At sunrise the process starts again.

Figure 3:
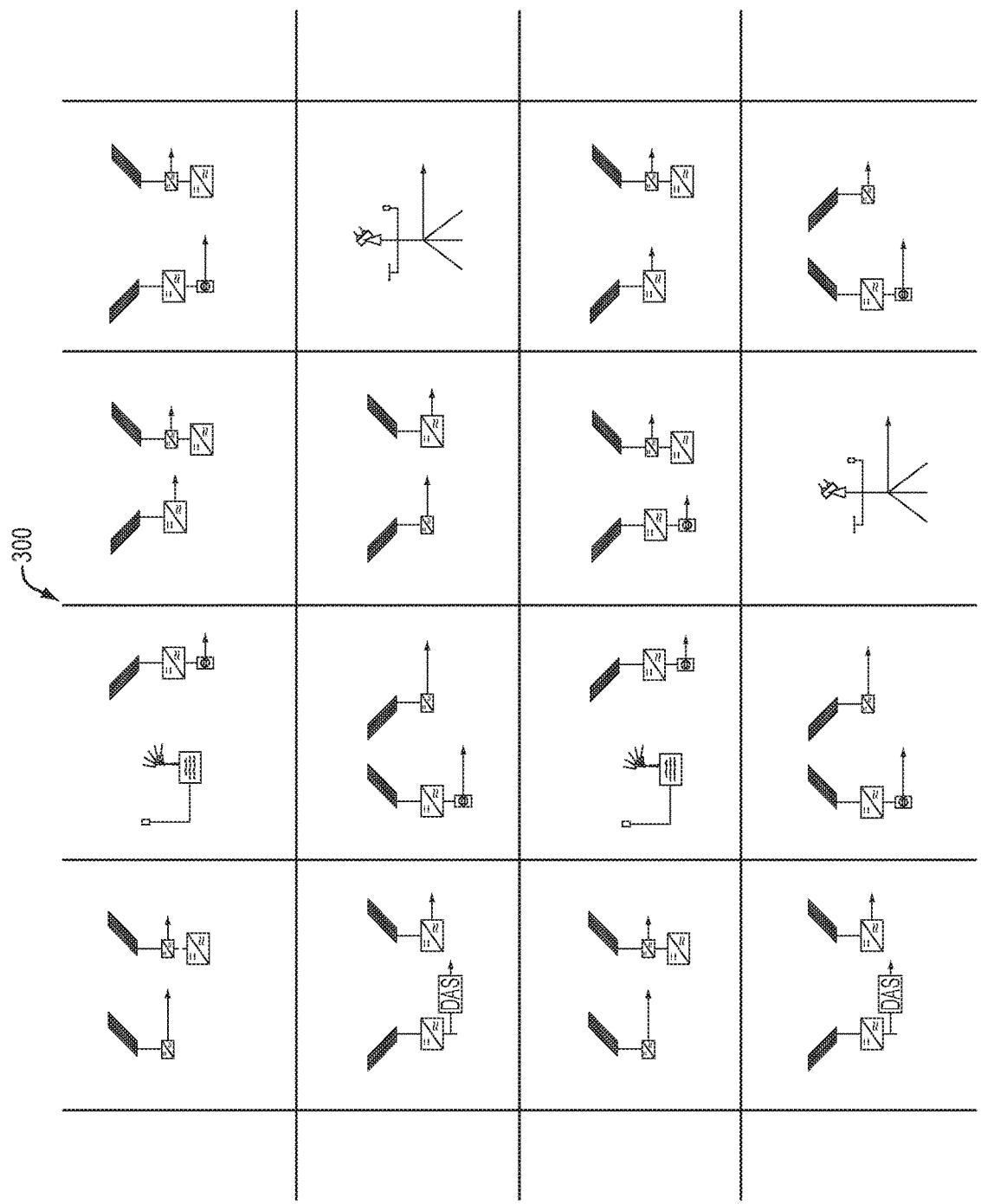
FIG. 3 is an example diagram 300 of the constituent parts of an irradiance sensing network.

FIG. 3 is an example of some combinations of two or more of an irradiance monitoring device 270 or a PV generating unit such as 210, 220, 230, 240, 250 or 260 which can measure and report its energy production and which have different tilt and or azimuth angles and are physically adjacent and which have communications capability to a central computer and are located in the gridded pattern 110 comprised of grid cells in the area of interest.

Figure 4:
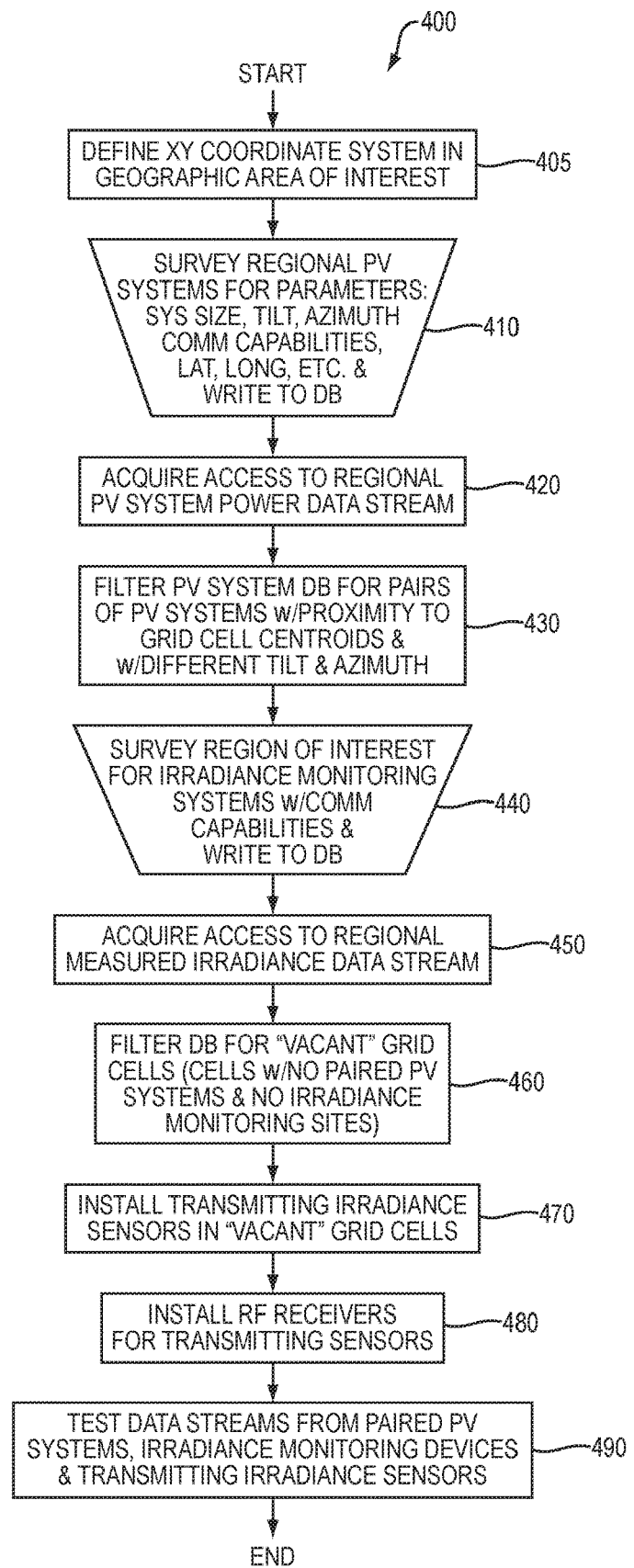
FIG. 4 is a flow diagram 400 describing the configuration and installation of the constituent parts of an example irradiance sensing network.

FIG. 4 shows a flow diagram illustrating a process, apparatus and software program for organizing ground-based irradiance and meteorological hardware measurement devices, satellite weather data, weather forecasting software, solar energy production simulation software, and electrical grid load forecasting software, that enables the measurement and forecasting of solar irradiance and solar power production in an area of interest, which can be created through the following steps:

1) A geographic XY grid coordinate system 400 for the area of interest for solar power measurement and forecasting is defined based upon a grid 405 which is coincident with one or more meteorological forecasting systems gridded projection. Each of the grid cell is labeled using the latitude and longitude of the geometric centroid of the cell.
2) The solar power generation systems within the region being considered, are surveyed 410 and their physical parameters, such as system size, tilt angle(s), azimuth angle(s), tracking type(s), equipment types, shading obstructions, latitude, longitude, elevation, and other features, are recorded and their features placed in a database as illustrated in FIG. 2D, 195. The survey of solar power systems in the area of interest also identifies any which have power monitoring systems which have the ability to communicate the value of their power production to a central computer via the internet, power line carrier, wireless signal or other means on a second by second basis or on a minute by minute basis or on a multiple minute interval, such as every five minutes, or on an hour by hour basis. The owners of the solar power production data are approached and use of the data is requested as illustrated in FIG. 4 420.

3) A survey of the area of interest is conducted to determine the existence and locations of pairs of solar power systems which are in close proximity and whose solar power arrays have different tilts and/or azimuth angles 410 and which have a system or systems for measuring their solar power production and which have the ability to communicate the value of their power production to a central computer. A computer database of the pairs of solar power systems in the area of interest is created as illustrated in FIG. 2D 195.

4) The geographic XY grid defined in step 1 above is evaluated and pairs of solar power systems which were identified in step 3 and which lie near the geometric centroid of each grid cell are associated with individual grid cells in the area of interest is created as illustrated in FIG. 4 430.

5) A survey of the area of interest is conducted to determine the existence and locations of solar irradiance monitoring stations which have the ability to communicate the value of their irradiance measurements to a central computer via the internet, power line carrier, wireless signal or other means 440. The solar monitoring stations are categorized based upon their ability to report any and all of the following: direct normal irradiance, diffuse horizontal, global horizontal irradiance or the irradiance measured at a unique tilt and azimuth angle. A computer database of the solar monitoring systems in the area of interest is created as illustrated in FIG. 2D 195.

6) The geographic XY grid defined in step 1 above is evaluated and solar irradiance monitoring stations which were identified in step 5 and which lie near the geometric centroid of any grid cell are associated with those individual grid cells in the coordinate system as illustrated in FIG. 4, 440.

7) The owners of the irradiance data for the monitoring systems which were identified in step 6 are approached and use of the data is requested as illustrated in FIG. 4, 450.

8) The geographic XY grid defined in step 1 is evaluated and grids cells which lack either pairs of solar power systems identified in step 3 above or solar monitoring station identified in step 6 above are marked for installation of wireless transmitting irradiance sensors in the "vacant" locations as illustrated in FIG. 4, 460.

9) One or more transmitting irradiance sensors, illustrated in FIG. 2B, capable of sending digitized radio frequency transmissions of irradiance and temperature measurements to a central computer, are installed in the grid cells which do not have either pairs of solar power systems identified in step 3 above or solar monitoring station identified in step 6. The transmitting sensors label each digitized measurement with a unique station number. The transmitting irradiance sensors are installed near the geometric centroid of grid cell 470.

10) One or more radio frequency receiving devices 480, illustrated in FIG. 2B, capable of receiving continuous digitized irradiance and temperature measurement signals from the transmitters described in step 9 is installed in the region of interest. They are connected to the internet via an internet portal such as a computer local area network or broadband internet connection on a wired or wireless network.

11) A process collects the transmissions arriving over the internet from the radio frequency receiving device described in step 10. The process maintains the unique station number labels on the transmissions. The process labels each unique transmission with a timestamp and stores multiple sensor transmissions from multiple grid cells in a database as illustrated in FIG. 4, 490.

Figure 5:
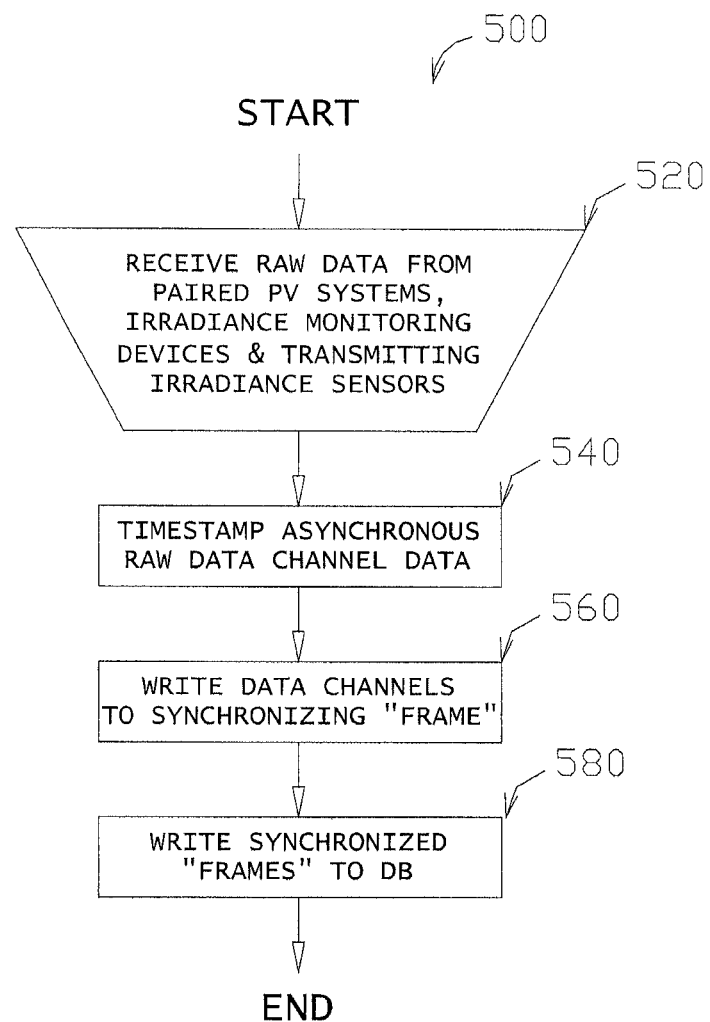
FIG. 5 is a flow diagram 500 describing an example the collection, time stamping, synchronization and storage of irradiance data from the sensing network.

FIG. 5 shows a flow diagram of a process, apparatus and software program for collecting, synchronizing and storing solar power and irradiance data from a sensing network in an area of interest, which can be created through the following steps:

1) A process 500 collects the transmissions arriving to a computer with a connection to the internet or other communications means from a plurality of solar power systems identified in FIG. 1. Pairs of solar power systems which are in close proximity and whose solar power arrays have different tilts and/or azimuth angles are identified from the database as illustrated in FIG. 5, 520.

2) A software program for creating synchronized data frames from diverse asynchronous irradiance and solar power data sources is run FIG. 5, 540.

3) The instantaneous values of the power production of the paired solar power systems described in step 2 are labeled with a timestamp and stored in a database by the program described in step 1 as illustrated in FIG. 5, 560, 580.

Figure 6:
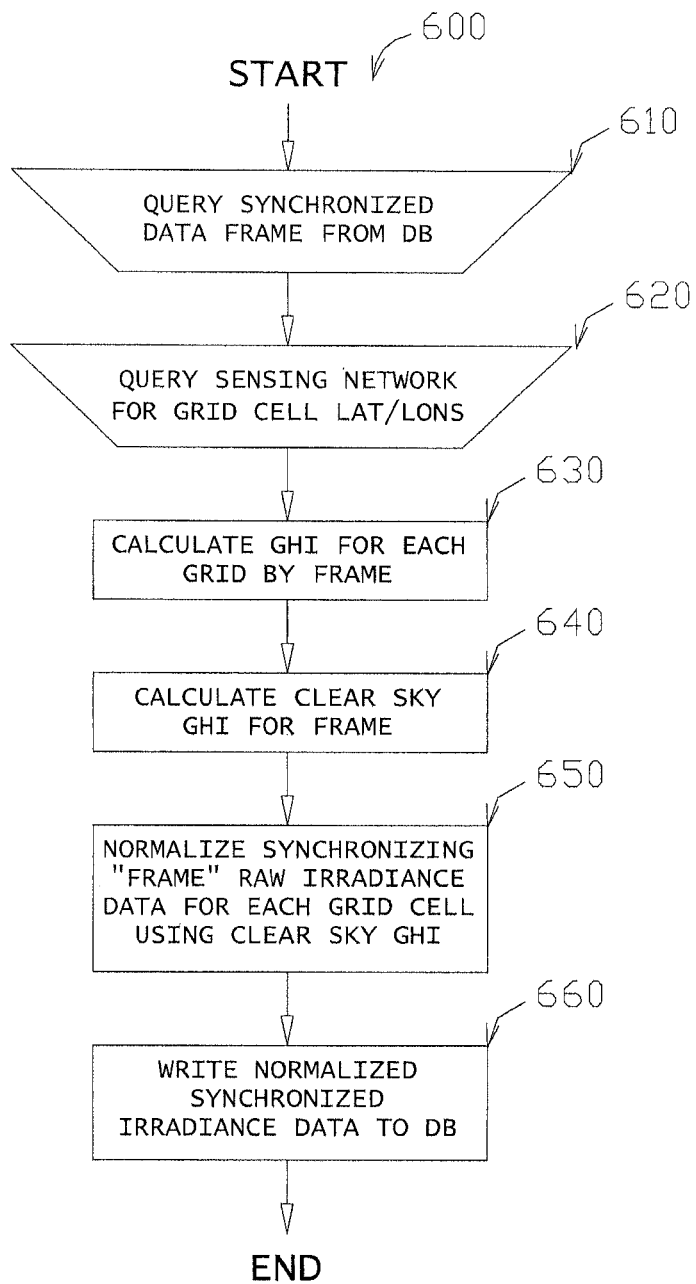
FIG. 6 is a flow diagram example process of creating an image of ground level global horizontal irradiance using a clear sky model for the date, time and location.
Figure 7A:
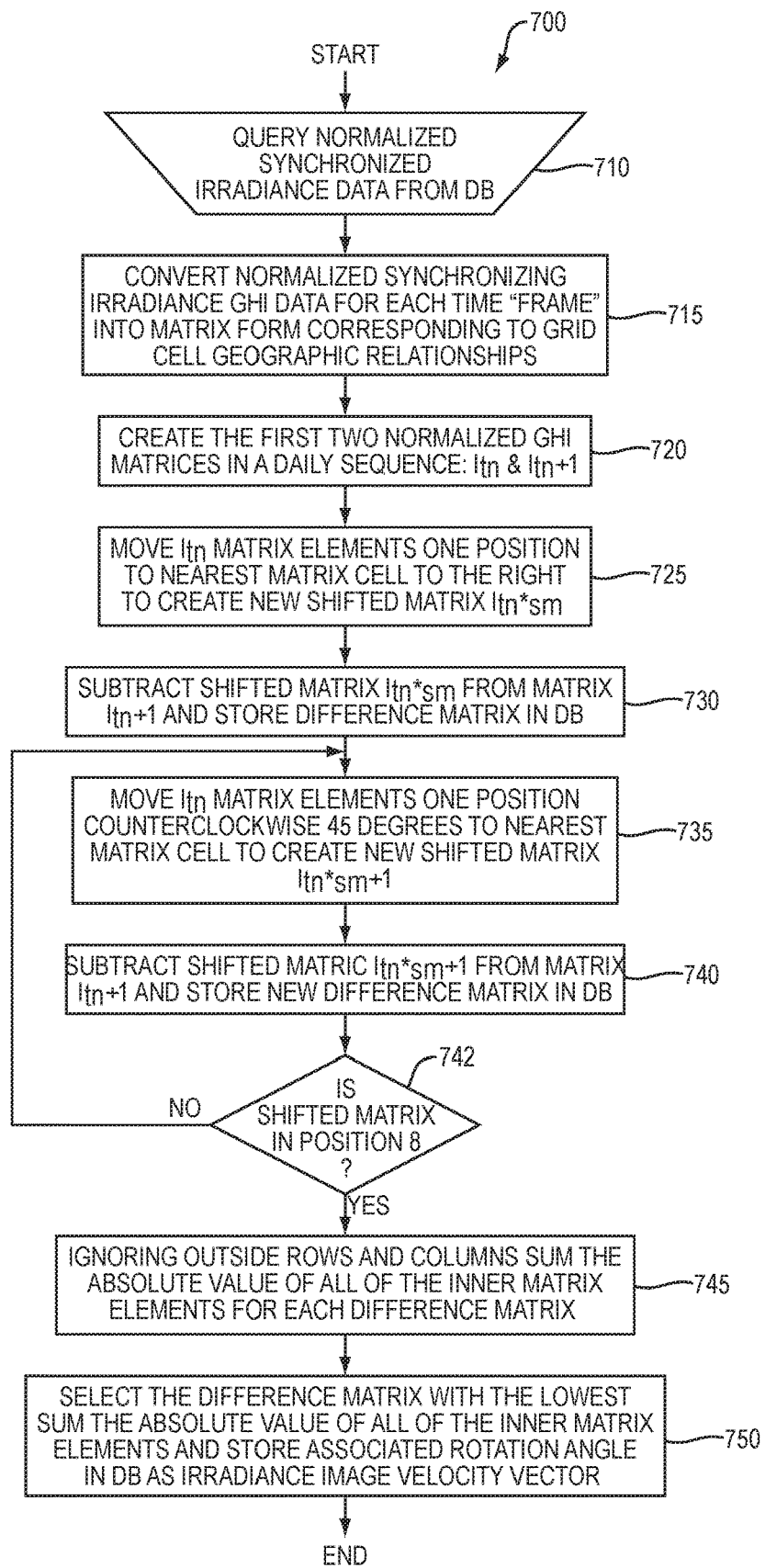

FIG. 6 shows a flow diagram of a process 600, apparatus and software program for the creation of a normalized image of ground level global horizontal irradiance (GHI) from solar power system power data and irradiance data, from an irradiance sensing network whose data has been stored to a database, which can be created through the following steps:

1) Query the database for the first instance in a daily cycle of a synchronized data frame of solar power system power data and irradiance data from the region of interest 610.

2) Query the database for the solar power system electrical characteristics and the system electrical parameters for solar power systems in the region of interest 620.

3) Calculate GTI for each solar power system in the region of interest using the solar power system electrical characteristics and the system electrical parameters for solar power systems and the solar power production data for each system of interest using the ac power output or dc power input of a solar power inverter 430. For example, for a photovoltaic power system to make this conversion knowledge of the inverter dc to ac conversion efficiency ($\mu_{inv}$), module efficiency ($\mu_{module}$), array system losses ($\mu_{sys}$), array area and temperature are necessary. The process of converting an ac power measurement to a value of incident irradiance can be represented as a transfer function, H(p). This transfer function represents the efficiency of the entire solar power system for converting incident irradiance into ac power. (This is an idealized model. A preferred embodiment uses the Sandia Photovoltaic Array Performance Model for the photovoltaic module conversion of irradiance to dc power. Other models can be used. Though not shown here, for all solar power module conversion models cell temperature is required.

For another embodiment system parameters, such as wire resistance losses in both the dc and ac systems may be included. In the equations shown here all system losses are combined and represented as $\mu_{sys}$.)

$$GTI = H(P_{ac})$$

$$P_{dc} = \frac{P_{ac}}{\mu_{inv} * \mu_{sys}}$$

$$GTI = \frac{P_{dc}}{(\text{Array Area} * \mu_{module})}$$

$$GTI = \frac{P_{ac}}{(\text{Array Area} * \mu_{module}) * \mu_{inv} * \mu_{sys}}$$

$$H(p) = GTI / P_{ac}$$

For photovoltaic systems which are mounted horizontally GTI=GHI.

This same process can be applied to systems which measure dc power, Pdc, directly, such as dc optimizers, by using the equation:

$$GTI = \frac{P_{dc}}{(\text{Array Area} * \mu_{module})}$$

4) The values of DNI, DHI and GHI are then calculated from at least two values of global tilt irradiance found in step 3. The calculation of DNI, DHI and GHI from GTI can be done using two simultaneously simulated values of GTI taken from solar power systems in close proximity and which possess similar, small, values of ground reflected irradiance. In the ideal form of the model below ground reflected irradiance or albedo is ignored. θ is the angle of incidence between the tilted surface for which GHI is being evaluated and the rays of the sun. Cos θ is derived:

cos θ=cos α cos($a_s$−$a_w$)sin β+sin α cos β

Where:

β is the elevation angle, from a horizontal plane, of the titled surface for which GHI is being evaluated.

α is the solar altitude angle.

$a_s$ is the solar azimuth angle.

$a_w$ is the azimuth angle of the plane.

At least two differently oriented plane surfaces are needed to derive values for DNI and DHI.

$GTI_1$=DNI cos $\theta_1$+DHI(1+cos $\beta_1$)/2

$GTI_2$=DNI cos $\theta_2$+DHI(1+cos $\beta_2$)/2

$\theta_1$, $\theta_2$, $\beta_1$ and $\beta_2$ are known physical characteristics of the (minimum) two solar power systems. With knowledge of these parameters we solve simultaneous equations for DNI and DHI.

$GTI_i$=DNI*cos $\theta_i$+DHI*$R_{d,i}$+$\rho_i$*GHI*$R_{r,i}$

Where:

$R_{di}$ is the sky diffuse ratio at site # i or tilt # i $R_{ri}$ is the surface reflectance diffuse ratio at site # i or tilt # i $\rho_i$ is the foreground albedo at site # i or tilt # i $A_i$ is the array azimuth at site # i or tilt # i and $R_{ri}$, $\rho_i$, and $A_i$ are known, surveyed characteristics of the sites or arrays, and $R_{di}$ is a parameter derived from local meteorological data.

$$GHI = DHI + DNI * \cos z$$

$$DHI = \frac{A_1 * GTI_2 - A_2 * GTI_2}{A_1 * B_2 - A_2 * B_1}$$

$$A_i = \cos\theta_i + \rho * R_{r,i} * \cos z$$

$$B_i = R_{d,i} + \rho_i * R_{r,i}$$

$$R_{d,i} \approx (1 + \cos\beta_i)/2$$

$$DNI = \frac{GTI_1}{A_1} - \frac{GTI_2 - \frac{A_2}{A_1} * GTI_1}{\frac{B_2}{B_1} - \frac{A_2}{A_1}}$$

GHI is then calculated as:

GHI=DNI cos θ+DHI

The resulting DNI, DHI and GHI values are place in a database.

5) A sky clear irradiance model, such as the Bird Clear Sky Model, is run for the each date and time for each measurement, for each latitude and longitude of each grid cell in the irradiance sensing network 640. The clear sky GHI results are stored in the database.

6) Each value of GHI associated with a grid cell in the sensing network, whether calculated in step 3 above or whether measured directly by one of the irradiance measurement devices, is divided by the clear sky value calculated in step 5 resulting in a normalized irradiance index as seen in FIG. 6, 650. The normalized GHI values are stored in the database 660.

FIGS. 7A, 7B, 7C, 7D, 7E and 7F: shows a flow diagram of a process, apparatus and software program for determining a velocity vector from ground level irradiance images, which can be created through the following steps:

1) The database is queried 710 and a sequence of normalized ground level irradiance sensor data is taken and converted to matrix than 715. FIG. 7B is a hypothetical 6×6 matrix representing a 36 contiguous normalized GHI sensor block with stored measured irradiance values. We then create a sequence of matrices which corresponds to a time series of instantaneous images of normalized GHI levels measured by the network. FIG. 7C illustrates a sequential pair of matrices, $I_{tn}$ and $I_{m+1}$, selected from the database 720.

2) The elements of the first of the two matrices ($I_{tn}$) are shifted in 45 degree increments, by one geographic increment such as a kilometer, to create a series of shifted matrices, $I_{tn*sm}$ 725. In this example the angular increments are 45 degrees (45, 90, 135, 180, 225, 270, 315 degrees) from the first position, which is a shift eastward, however this angular value could be any increment of degrees or fractions of a degree. The arrows associated with each matrix represent the angle and direction to which the matrix values were shifted. In this example a total of eight permutations of the original matrix are created as seen in FIG. 7D. In the example in FIG. 7D the number arrows illustrate a shift of the matrix elements in the following directions: 721 is shifted to the right, 721 is shifted 45 degrees counterclockwise, 723 is shifted 90 degrees counterclockwise, 724 is shifted 135 degrees counterclockwise, 725 is shifted 180 degrees counterclockwise, 726 is shifted 225 degrees counterclockwise, 727 is shifted 270 degrees counterclockwise, and 728 is shifted 315 degrees counterclockwise. In terms of the geographic area to which these values correspond the pattern described by the matrix depicts a change in the ground level irradiance pattern in the following compass directions: 721 is shifted eastward, 721 is shifted northeastward, 723 is shifted northward, 724 is shifted northwestward, 725 is shifted westward, 726 is shifted southwestward, 727 is shifted southward, and 728 is shifted southeastward.

3) The shifted matrices ($I_{m*s1}$ through $I_{m*s8}$) 735 are subtracted from the second matrix in the original sequence of matrices ($I_{m+1}$) 730. This forms eight "difference" matrices as illustrated by examples in FIG. 7D and 740.

4) Ignoring the boundary rows and columns (first and last row; first and last column represented by "Xs"), the absolute values of all of the central row and column elements are calculated and summed for each difference matrix 745. For this example FIG. 7E is the difference matrix for $I_{m*s1}$ and $I_{m+2}$. The difference matrix for $I_{m*s2}$ and $I_{m+1}$ is represented in FIG. 7E. The difference matrix for $I_{m*s2}$ and $I_{m+1}$, which the sum of the absolute values of central elements, is the lowest value amongst the eight cases, as illustrated by FIG. 7F, and is the one which "correlates" (the term "correlate" is used here in a broad sense, not a strictly mathematical sense) best to the shift in the pattern of ground level irradiance between time $t_n$ and time $t_{n+1}$ 750.

5) The shift in the pattern of ground level irradiance can be represented as a velocity vector defined by the coordinates of any of the origin elements and the terminus elements and the time increment between $t_n$ and time $t_{n+1}$. This vector can then be applied to the irradiance image $I_{m+1}$ to forecast a future irradiance image, represented here in matrix form, $I_{m+2}$.

6) A feedback loop can be included in the process to make successive corrections to the testing step 4 above. In addition wind speed and direction and other meteorological parameters may be included in the model.

Figure 8:
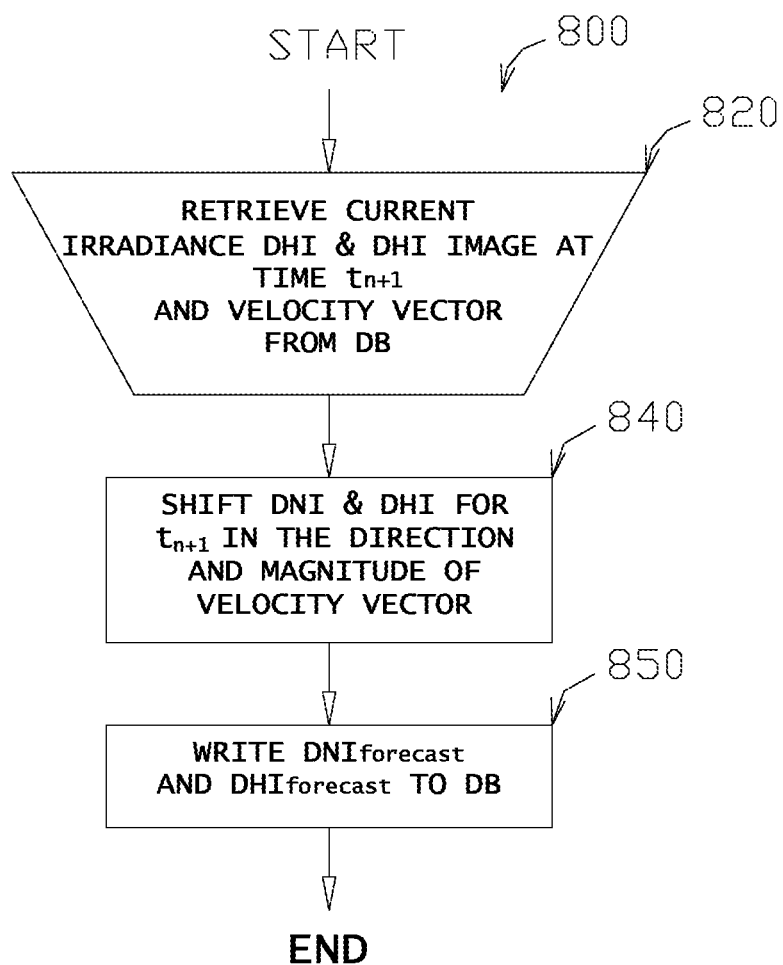
FIG. 8 is a flow diagram which describes an example process of forecasting a future location of a ground level irradiance image.

FIG. 8 shows a flow diagram of a process 800, apparatus and software program for forecasting ground level DNI and DHI, which can be created through the following steps:

1) Retrieve the most recently stored values of DNI and DHI from the database for the daily cycle. In FIG. 8 these values of DNI and DHI are illustrated as occurring at time $t_{n+1}$ 820.

2) Retrieve the irradiance velocity vector for time $t_{n+1}$ 820.

3) Shift the values of DNI and DHI for time $t_{n+1}$ in the direction and magnitude of the irradiance image velocity vector 840.

4) Label the shifted DNI and DHI values with their new locations as $DNI_{forecast}$ and $DHI_{forecast}$ at time $t_{n+2}$.

5) The forecast ground level $DNI_{forecast}$ and $DHI_{forecast}$ for each site in the area of interest is written to a database 850.

Figure 9:
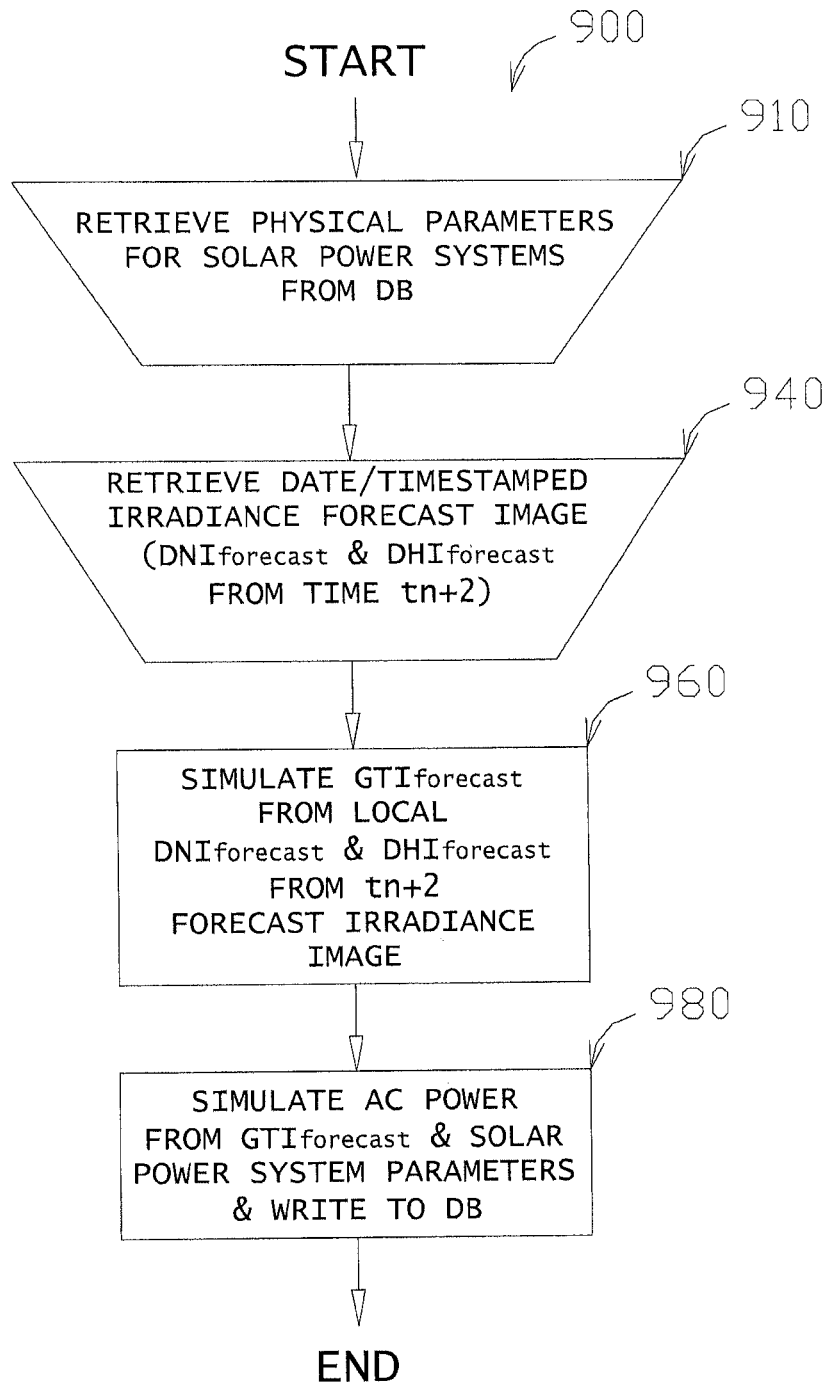
FIG. 9 is a flow diagram example process of forecasting electrical production of solar power systems based upon the location of the forecast image of irradiance and the physical characteristics of the systems.

FIG. 9 shows a flow diagram of a process 900, apparatus and software program for forecasting energy production from solar power systems in the region of interest, which can be created through the following steps:

1) Query the database for the current ambient temperature from metrological forecasts and solar power system electrical characteristics and the system electrical parameters for solar power systems in the region of interest 910.

2) Retrieve the forecast values of $DNI_{forecast}$ and $DHI_{forecast}$ for the latitude and longitude of the solar power system to be modeled. In FIG. 9 these forecast values occur at time $t_{n+2}$ 940.

3) Calculate forecast global tilt irradiance (GTI) by:

$$GTI_{forecast}=DNI_{forecast} \cos \theta + DHI_{forecast}(1+\cos \beta)/2$$

Where θ is the angle of incidence between the tilted surface of the solar power system collector and the sun and β is the elevation angle of the titled surface 960.

4) Calculate the power output of a solar power system using the forecast irradiance incident upon the surface of the solar array (global tilt irradiance or GTI), the temperature, and the solar power system electrical characteristics. For example, to simulate the ac power production of a photovoltaic system, knowledge of the inverter dc to ac conversion efficiency ($\mu_{inv}$), module efficiency ($\mu_{module}$), array system losses ($\mu_{sys}$), array area and cell temperature are necessary. (This is an idealized model. The preferred embodiment of this invention uses the Sandia Photovoltaic Array Performance Model for the photovoltaic module conversion of irradiance to dc power. Other models can be used. Though not shown here, for all PV module conversion models cell temperature is required. For another embodiment system parameters, such as wire resistance losses in both the dc and ac systems will be included. In the equations shown here all system losses are combined and represented as $\mu_{sys}$.)

$$P_{dc}=GTI*Array\ Area*\mu_{module}$$

$$P_{ac}=P_{dc}*\mu_{inv}*\mu_{sys}$$

$$P_{ac}=GTI*Array\ Area*\mu_{module}*\mu_{inv}*\mu_{sys}$$

Other solar power systems can be modeled in a similar manner 980.

5) For solar power systems which are constructed of more than one tilt an azimuth angle, dc power (Pdc) will be calculated for each surface.

6) The total ac power of a collection of solar power systems can be calculated as the sum of the instantaneous dc powers times the system losses and inverter losses. The calculation of ac power, Pac, from dc power, Pdc, is done with the application of system losses to the dc power. In this idealized model, though other factors such as wire losses, shading and soiling apply, the system losses are represented solely as inverter efficiency losses, μinv.

$$P_{ac}=\mu_{sys}*\mu_{inv}*\Sigma P_{dc}$$

7) The forecast solar power system production for each site in the area of interest is written to a database 980.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth. In operation, a general purpose or application specific processor loads and executes the software in a manner well understood in the art.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
   continuously collecting data from a plurality of photovoltaic (PV) systems or irradiance sensors in a geographic area;
   calculating, on a computer processor, irradiance incident upon the plurality of PV systems or irradiance sensors from the collected data;
   combining, on the computer processor, values of calculated incident irradiance from groups of two or more PV systems or irradiance sensors which are in close proximity to each other and have differing tilt and azimuth angles;
   calculating, on the computer processor, solar radiation from the combined values of incident irradiance by calculating values of direct normal irradiance (DNI) and diffuse horizontal irradiance (DHI) from each group of two or more PV systems or irradiance sensors and deriving, from the values of DNI and DHI, associated values of global horizontal irradiance (GHI);
   associating GHI, DNI and DHI values with cells of a grid defined on the geographic area to provide gridded values of GHI, DNI and DHI;
   normalizing the gridded values of GHI in an image time series by calculating a clear sky model GHI value for each grid cell latitude and longitude, and each day and minute in the image time series and dividing each gridded value of GHI by the corresponding clear sky model GHI value;
   deriving a velocity vector associated with the image time series, the velocity vector having a direction and a magnitude;
   creating a forecast grid of DNI and DHI values based on the grid by: (a) shifting the gridded values of DNI and DHI in the direction and by the magnitude of the derived velocity vector; and (b) mapping the shifted DNI and DHI values to the geographic area, the shifted DNI and DHI values being forecasted DNI and DHI values; and
   forecasting photovoltaic power production values in the geographic area by calculating photovoltaic power production values based upon the forecasted DNI and DHI values of the forecast grid and characteristics of the plurality of PV systems in the geographical area.

2. The method of claim 1 wherein collecting data includes:
   collecting power production data from a plurality of photovoltaic generating units which can measure and report energy production.

3. The method of claim 1 wherein collecting data includes:
   collecting power production data from a plurality of kilowatt-hour meters which meter output of photovoltaic generating units.

4. The method of claim 1 wherein collecting data includes:
   collecting power production data from a plurality of data acquisition systems which monitor photovoltaic generating units.

5. The method of claim 1 wherein collecting data includes:
   collecting irradiance data from a plurality of irradiance meters.

6. The method of claim 1 wherein collecting data includes:
   collecting irradiance data from a combination of photovoltaic (PV) generating units, kilowatt-hour meters which meter the output of the PV generating units, and data acquisition systems which monitor the PV generating units.

7. The method of claim 1 wherein calculating irradiance incident upon the plurality of PV systems or irradiance sensors from the collected data includes:
   collecting data indicating power produced by a photovoltaic (PV) generating unit;
   retrieving characteristics of the PV generating unit from a database;
   deriving the incident irradiance based upon the power produced by the PV generating unit and the retrieved characteristics.

8. The method of claim 1 further comprising calculating a forecast global tilt irradiance for each of the plurality of PV systems based on the forecasted DNI and DHI values, and respective tilt and azimuth angles of each PV system in the geographic area.

9. The method of claim 8 further comprising calculating power output for each of the plurality of PV systems based on the respective forecast global tilt irradiance, a respective temperature, and respective electrical characteristics of the PV system.

10. A system for determining solar radiation comprising:
    a computer processor configured to:
    continuously collect data from a plurality of photovoltaic (PV) systems or irradiance sensors in a geographic area;
    calculate irradiance incident upon the plurality of PV systems or irradiance sensors from the collected data;
    combine values of calculated incident irradiance from groups of two or more PV systems or irradiance sensors which are in close proximity to each other and have differing tilt and azimuth angles;
    calculate solar radiation from the combined values of incident irradiance by calculating values of direct normal irradiance (DNI) and diffuse horizontal irradiance (DHI) from each group of two or more PV systems or irradiance sensors and deriving, from the values of DNI and DHI, associated values of global horizontal irradiance (GHI);
    associate GHI, DNI and DHI values with cells of a grid defined on the geographic area to provide gridded values of GHI, DNI and DHI;
    normalize the gridded values of GHI in an image time series by calculating a clear sky model GHI value for each grid cell latitude and longitude, and each day and minute in the image time series and dividing each gridded value of GHI by the corresponding clear sky model GHI value;
    derive a velocity vector associated with the image time series, the velocity vector having a direction and a magnitude;

create a forecast grid of DNI and DHI values based on the grid by: (a) shifting the gridded values of DNI and DHI in the direction and by the magnitude of the derived velocity vector; and (b) mapping the shifted DNI and DHI values to the geographic area, the shifted DNI and DHI values being forecasted DNI and DHI values; and forecast photovoltaic power production values in the geographic area by calculating photovoltaic power production values based upon the forecasted DNI and DHI values of the forecast grid and characteristics of the plurality of PV systems in the geographical area.

11. The system of claim 10 wherein the computer processor is further configured to calculate a forecast global tilt irradiance for each of the plurality of PV systems based on the forecasted DNI and DHI values, and respective tilt and azimuth angles of each PV system in the geographic area.

12. The system of claim 11 wherein the computer processor is further configured to calculate power output for each of the plurality of PV systems based on the respective forecast global tilt irradiance, a respective temperature, and respective electrical characteristics of the PV system.

13. A non-transitory computer readable storage medium containing a set of instructions that, when executed by a processor, perform a method for determining solar radiation comprising:

continuously collecting data from a plurality of photovoltaic (PV) systems or irradiance sensors in a geographic area;

calculating irradiance incident upon the plurality of PV systems or irradiance sensors from the collected data;

combining values of calculated incident irradiance from groups of two or more PV systems or irradiance sensors which are in close proximity to each other and have differing tilt and azimuth angles;

calculating solar radiation from the combined values of incident irradiance by calculating values of direct normal irradiance (DNI) and diffuse horizontal irradiance (DHI) from each group of two or more PV systems or irradiance sensors and deriving, from the values of DNI and DHI, associated values of global horizontal irradiance (GHI);

associating GHI, DNI and DHI values with cells of a grid defined on the geographic area to provide gridded values of GHI, DNI and DHI;

normalizing the gridded values of GHI in an image time series by calculating a clear sky model GHI value for each grid cell latitude and longitude, and each day and minute in the image time series and dividing each gridded value of GHI by the corresponding clear sky model GHI value;

deriving a velocity vector associated with the image time series, the velocity vector having a direction and a magnitude;

creating a forecast grid of DNI and DHI values based on the grid by: (a) shifting the gridded values of DNI and DHI in the direction and by the magnitude of the derived velocity vector; and (b) mapping the shifted DNI and DHI values to the geographic area, the shifted DNI and DHI values being forecasted DNI and DHI values; and forecasting photovoltaic power production values in the geographic area by calculating photovoltaic power production values based upon the forecasted DNI and DHI values of the forecast grid and characteristics of the plurality of PV systems in the geographical area.

14. The non-transitory computer readable storage medium of claim 13 wherein the method for determining solar radiation further comprises calculating a forecast global tilt irradiance for each of the plurality of PV systems based on the forecasted DNI and DHI values, and respective tilt and azimuth angles of each PV system in the geographic area.

15. The non-transitory computer readable storage medium of claim 14 wherein the method for determining solar radiation further comprises calculating power output for each of the plurality of PV systems based on the respective forecast global tilt irradiance, a respective temperature, and respective electrical characteristics of the PV system.

\* \* \* \* \*